Sept. 14, 1965 A. FEINER 3,206,649
MAGNETIC SWITCHING ARRANGEMENT
Filed June 8, 1962 2 Sheets-Sheet 1

INVENTOR
A. FEINER
BY
[signature]
ATTORNEY

INVENTOR
A. FEINER
BY
[signature]
ATTORNEY 3,206,649

MAGNETIC SWITCHING ARRANGEMENT

Alexander Feiner, Morris Plains, N.J., assignor to Bell Telephone Laboratories, Incorporated, New York, N.Y., a corporation of New York Filed June 8, 1962, Ser. No. 201,005
14 Claims. (Cl. 317—137)

This invention relates to magnetic switching arrangements which employ a magnetic structure and a plurality of magnetizable switches and more particularly to such arrangements wherein the switches are selectively operable by the control of magnetic fluxes within the magnetic structure.

In many instances it is desired to perform a logical operation represented by the open or closed state of relay contacts. In the past such operations have utilized individual relay structures in circuit combinations to attain the desired functions. Such functions may comprise digit comparison, such as determining that a given pair of digits is always equal to another given pair of digits, checking that an even number of digits is always present, such as two-out-of-four of four-out-of-four, that any odd number of digits is present or that any digit is absent, indicating an invalid code.

It is an object of my invention to provide new structural arrangements wherein a plurality of switches, such as sealed reed switches, are magnetically disposed on a single magnetic structure.

It is a further object of my invention to provide such arrangements wherein the individual reed switches may be utilized in distinct electrical circuit paths but wherein the magnetic circuits for operating the various switches are contained within a single magnetic structure.

I attain these and other objects of my invention in specific illustrative embodiments thereof wherein a remanently magnetic structure is provided having a plurality of independently magnetizable sections and a plurality of sealed reed switches of the type disclosed in W. B. Ellwood Patent 2,289,830, July 14, 1942, bridging the structure. A separate energizing coil is wound about each section and a pulse source is connectable to each coil to cause its energization and selective changing of the magnetic remanence of the associated section. One particular condition of remanence of the combination of sections may be taken as the initial state and the input pulse sources may, after a particular energization of the coils, return the structure to that initial state. Alternatively, successive logical operations may be performed without returning to the initial state, each succeeding operation serving to determine the states of magnetization of all sections of the structure.

In one specific illustrative embodiment of my invention the magnetic sections are arranged in a closed structure, such as a toroid, and the reed switches are located along diameters of the toroid to bridge the structure. In a second illustrative embodiment the magnetic structure is defined by cross members radially positioned from a central point and the reed switches extend between the outer ends of these members.

In the first embodiment wherein a closed magnetic structure is utilized, the reeds bridge the structure in a manner such that each section is magnetically coupled to and situated between a pair of adjacent switches: one reed of each switch is magnetically coupled to two adjacent magnetic sections. In this embodiment of my invention there are $2n+4$ sections and $n+2$ sealed reed switches (where $n$ equals zero or any whole integer) positioned in the manner explained. In the simplest example where $n$ equals zero, there are four sections and two switches.

The remanent magnetization of each section in this embodiment can control the operation of a pair of adjacent switches. Moreover, the remanent magnetization of a pair of adjacent sections, between which is coupled a reed, will independently control the magnetic condition of that reed. Thus, selective remanent magnetization of all the sections will cause operation of particular ones or none of the switches, the magnetization of each section partially controlling the operations of an adjacent pair of switches and the magnetization of adjacent sections controlling the operation of a switch which has one of its reeds positioned therebetween.

Remanently magnetic materials are well known in the art. They are characterized by the retention of a substantial amount of magnetism after removal of a magnetizing force and they exhibit at least two stable remanent magnetization states.

The reed switches are operated by establishing magnetic poles on the reeds such that magnetic flux flows through the switch. Advantageously, opposite magnetic poles are actively placed on the two reeds of the switch, though a magnetic pole may by induction establish an opposite magnetic pole on the other reed. In this embodiment of my invention a magnetic pole is induced on one reed of a switch by applying appropriate polarity pulses to the windings on the two adjoining sections to cause (from a series standpoint) opposite remanent magnetizations of the sections. If the other reed is not independently magnetized or is oppositely magnetized, magnetic flux will be caused to flow through both reeds of the switch and back through the magnetic core because of the lower reluctances presented by these elements in comparison to the reluctance presented by air. As a consequence, the switch is closed. An opposite magnetic pole is induced in the other reed in a similar manner by oppositely remanently magnetizing the two next adjacent sections adjoining the other reed of the switch.

A released condition of any one or more of the switches is effected by placing similar magnetic poles at the respective reeds of a switch or by substantially demagnetizing both reeds. The two reeds of a switch can both be substantially demagnetized by applying appropriate polarity pulses to the windings on the respective two next adjacent sections adjoining the respective reeds to cause similar (from a series standpoint) remanent magnetizations of the sections. No substantial amount of flux is caused to flow through the reeds, and the natural stiffnesses of the reeds cause their mutual release or cause the reeds to stay apart. Similar magnetic poles can be induced at the two reeds by oppositely remanently magnetizing the respective two adjacent sections adjoining the respective reeds of the switch. The similar magnetic poles on the reeds cause their mutual repulsion.

In a second embodiment of my invention, the same number of independently magnetizable sections and reed switches may be provided. Each radial leg of the magnetic structure has a distinct control winding on it and is capable of assuming a distinct magnetic state independent of the magnetic states of other portions of the structure. Each radial leg determines a magnetic pole at reeds of two switches, the magnetic poles on the cooperating reeds of these two switches being separately determined by the states of magnetization of the two adjacent radial legs. Again the switches are operated, i.e., closed, when opposite magnetic poles appear at their reeds which occurs when, from a series standpoint, the same states of magnetic remanence are induced in the adjacent legs between which the switch extends. This may also be considered by noting that, from a radial standpoint, the magnetic states of the adjacent legs are opposite.

It is a feature of my invention that a single magnetic structure defines a plurality of distinct, magnetizable sections between different ones of which are extended magnetizable reed pairs.

It is a further feature of my invention that the distinct sections of the single structure be each independently magnetizable by a separate pulse or signal source and circuitry be provided for simultaneously determining the logical states of the reed switches.

It is a feature of one embodiment of my invention that the magnetic structure comprises a closed structure definable in a plurality of sections with a reed being magnetically coupled to a structure part between two adjacent sections and each section being common to two adjacent switches.

It is a feature of a second embodiment of my invention that the magnetic structure comprises cross members defining radial legs extending from a common point with a reed switch extending between the outer ends of adjacent legs.

A complete understanding of these and other objects, features, and advantages of my invention may be gained from a consideration of the following detailed description and the accompanying drawing, in which.

Figure 1:
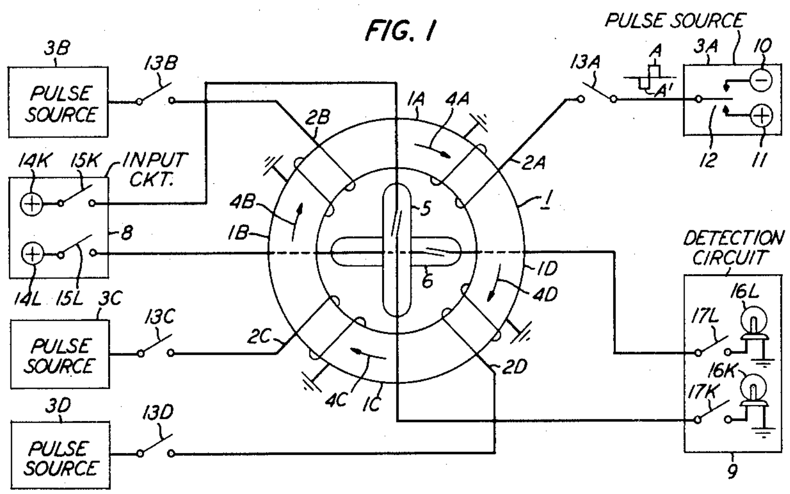
FIG. 1 depicts one illustrative embodiment of my invention.

In FIG. 1 I depict a ring-shaped core 1 having four sections 1A, 1B, 1C, and 1D and a pair of sealed reed switches 5 and 6 bridging opposite sides of the core such that each section is situated between one reed of each switch and only one reed is positioned between two adjoining sections. The core is of a remanently magnetic material capable of sustaining independent remanent magnetizations for the four sections. Wound about each section is a winding 2 which is grounded at one terminal and connected at the other terminal through a switch 13 to a pulse source 3, each of which may be of any known type capable of generating positive and negative polarity signals such as A and A′. Pulse source 3A, which is exemplary of the other pulse sources 3B, 3C and 3D, may comprise negative battery 10 and positive battery 11, either of which is connectable through internal switch 12 to the output terminal of the pulse source. It would be obvious to one skilled in the art that momentary or continuous closure of switches 13 can be effected individually, concurrently, simultaneously, or otherwise in any particular combination. The remanent magnetization states of the core sections 1A, 1B, 1C, and 1D are represented by arrows 4A, 4B, 4C, and 4D.

Each of the four sections 1A, 1B, 1C, and 1D is independently remanently magnetizable in either of two stable states depending upon the polarity of the signal applied to its corresponding winding. Accordingly, in this embodiment, there are sixteen possible remanent magnetization patterns of the sections caused by sixteen sets of input signals applied to the windings. Moreover, each of the switches 5 and 6 has two stable switching states, i.e., open and closed. Accordingly, in this embodiment, there are four possible combinations of switching states for the two switches. As will become apparent from the below discussion, these four combinations of switching states of the switches can be effected by particular ones of the sixteen possible remanent magnetization patterns of the sections.

Figure 2:
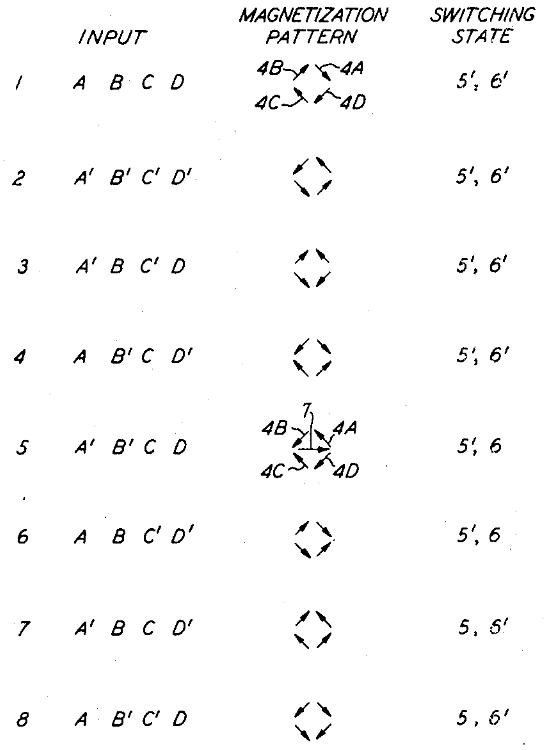
FIG. 2 is a table of examples of input signal conditions which can be applied to the windings of the embodiment of FIG. 1, the resulting magnetization patterns of the core sections, and the resulting switching states of the switches.

The operation of my invention can best be understood with reference to FIG. 2, which is a self-explanatory table listing, as examples, eight of the mentioned sixteen possible input signal combinations, the resulting remanent magnetization patterns of the sections, and the resulting switching states of the switches. The letters (e.g., A) under the column heading "INPUT" represent positive polarity signals and the primed letters (e.g., A′) represent negative polarity signals. In the second column entitled, "Magnetization Pattern," the arrows 4A, 4B, 4C and 4D represent the remanent magnetization states of the respective sections 1A, 1B, 1C, and 1D. The numbers (e.g., 5) under the column heading "Switching State" represent operated or closed states of the reed switches, while the primed numbers (e.g., 5′) represent the released or open states of the reed switches.

The reed switches 5 and 6 can be selectively operated by appropriately remanently magnetizing the core sections 1A, 1B, 1C, and 1D such as to cause magnetic flux to flow through the switch or switches desired to be operated. On the other hand, release of the switches is effected by appropriately remanently magnetizing the sections 1A, 1B, 1C, and 1D such as to cause magnetic flux to bypass the reed switches. This is accomplished in either case by applying suitable polarity input signals from the respective sources 3A, 3B, 3C, and 3D through closed switches 13A, 13B, 13C, and 13D to respective windings 2A, 2B, 2C, and 2D of FIG. 1.

For example, consider the case of line 1 of FIG. 2. In this case the positive polarity pulses A, B, C, and D indicated in the first column are applied from the respective pulse sources 3A, 3B, 3C, and 3D to the respective windings 2A, 2B, 2C, and 2D. This causes magnetizing forces in the core sections 1A, 1B, 1C, and 1D, which forces cause the remanent magnetization states of these sections to be in directions as indicated by arrows 4A, 4B, 4C, and 4D in the second column. The remanent states of the sections cause magnetic flux to flow in a clockwise direction about the core substantially circumventing the reed switches 5 and 6. Accordingly, neither switch is operated as indicated by the numbers 5′ and 6′ in the third column.

As another example, consider the case of line 5 of FIG. 2. When the indicated pulses A′, B′, C and D from sources 3A, 3B, 3C, and 3D are applied to the respective windings 2A, 2B, 2C, and 2D, magnetizing forces are caused in the respective sections 1A, 1B, 1C, and 1D which set the remanent states of the sections to be in directions as indicated by the respective arrows 4A, 4B, 4C, and 4D in the second column. The magnetic fluxes, in this case, flow in two separate paths. One flux flows counterclockwise through section 1A, through section 1B, and through both reeds of switch 6, as indicated by arrow 7 pointing to the right. The other flux flows clockwise through section 1D, through section 1C, and through both reeds of switch 6, as indicated by the same arrow 7. No substantial amount of magnetic flux flows through switch 5. Accordingly, switch 6 is operated, while switch 5 is in a released state, as indicated by the numbers 5′ and 6 in the third column of FIG. 2.

Similarly, as will be apparent to one skilled in the art, the remainder of the listed eight sets of input signals, when applied to the respective windings, cause selective remanent magnetizations of the core sections and the combinational operations of the reed switches.

Returning to FIG. 1 there are also depicted there an input circuit 8 and a detection circuit 9 connected to opposite reeds of the switches 5 and 6. These circuits represent the various manners of connecting the switches, in series and parallel circuits, in input circuit arrangements and connecting various detecting elements to the switches. For purposes of illustration, FIG. 1 depicts the input circuit 8 as comprising batteries 14K and 14L connected to respective switches 15K and 15L. The detection circuit 9 is depicted as comprising visual lamps 16K and 16L connected to switches 17K and 17L. It would, of course, be obvious to one skilled in the art that other known elements can also be employed in these circuits; for example, the input circuit 8 can comprise other signal sources and circuit connecting switches for effecting the mentioned series and parallel connections of the switches 5 and 6; and the detection circuit 9 can comprise an inverter circuit connected serially or in parallel to a detector. While two specific examples of logical arrangements for utilizing the embodiment of FIG. 1 are given below, it is apparent that other examples of circuit connections and logical operations would be apparent to one skilled in the art.

Turning again to FIG. 2 it can be seen that the four instances in which neither switch is operated correspond to input conditions wherein the simultaneously applied inputs A, B, C, and D, representing an even number of pulses, are such that $AB=CD$. Accordingly a two-bit comparator circuit would comprise the embodiment of FIG. 1 in which the input circuitry includes a signal source and the connection of switches 5 and 6 in parallel and the output circuitry includes an inverter and a detector, the detector thus being energized in the absence of a signal from the signal source through switches 5 and 6. Similarly, looking at FIG. 2 it can be seen that in all cases at least one switch is open. Accordingly, by arranging the input circuitry 8 so that the switches 5 and 6 are connected in parallel and the output circuitry 9 to include again an inverter and detector, the simultaneous presence of an even number of pulses can be detected.

Other arrangements, in which a larger number of sections and switches are employed, lend themselves to more complex logical operations.

Figure 3:
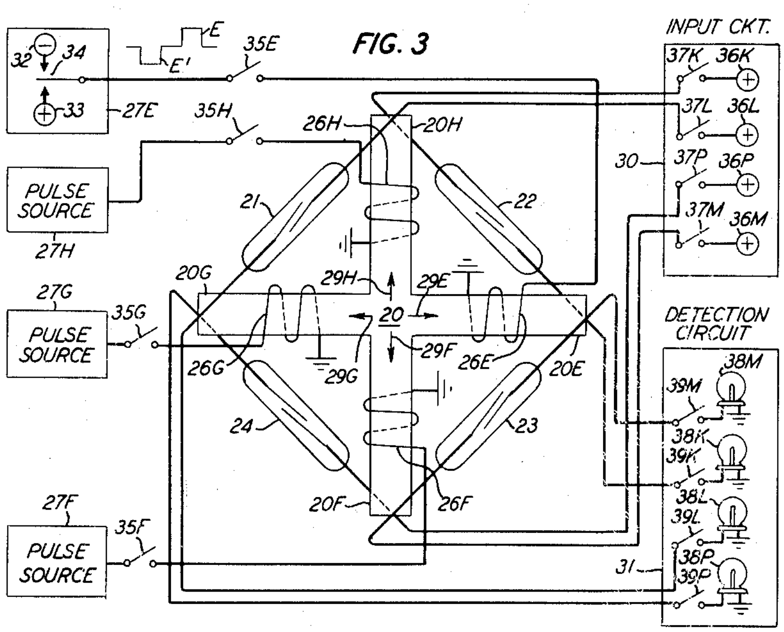
FIG. 3 depicts a second illustrative embodiment of my invention.

Turning now to FIG. 3 there is depicted a second illustrative embodiment of my invention in which the magnetic structure 20 is an integral member having legs or portions 20E, 20F, 20G, and 20H extending radially from the point of crossing of the legs. Reed switches 21, 22, 23, and 24 extend between the outer ends of the legs. A distinct control winding 26 is coupled to each leg and connected to an individual input pulse source 27. The remanent magnetization states are represented by the arrows 29. Input circuit 30 and detection circuit 31 are again connected to opposite reeds of the switches and represent the possible arrangements of the switches for various logical operations.

Figure 4:
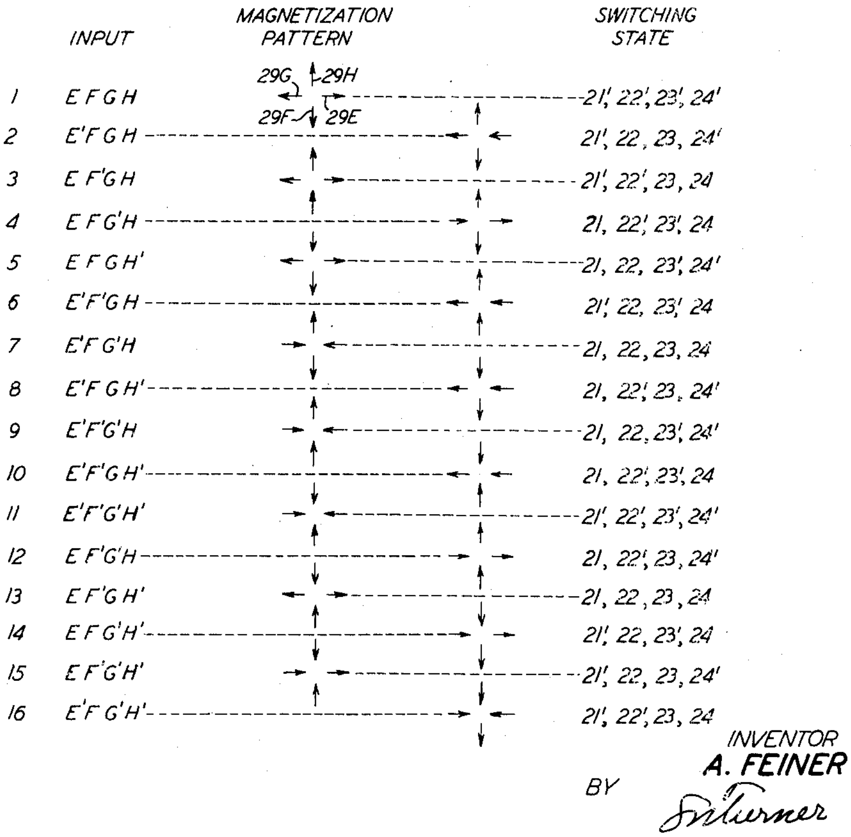
FIG. 4 is a table of input signal conditions, magnetization patterns, and switching states for the embodiment of FIG. 3.

FIG. 4, similar to FIG. 2, lists the inputs, the magnetization patterns, and the switching states for the sixteen possible input combinations.

Although I have shown the magnetic structures 1 and 20 to be preferably of a remanent magnetic material, within the broad aspects of my invention, I can also employ a highly permeable material, e.g., iron-nickel alloy. In this case, however, the input signals must be applied continuously to the windings in order to maintain desired flux conditions in the respective sections. When the magnetic forces are removed, that is to say, when the input signals are removed from the windings, the reed switches will be released if previously operated.

It is to be understood that the above-described embodiment is illustrative of the principles of my invention. Numerous other arrangements may be devised by those skilled in the art without departing from the spirit and scope of my invention.

What is claimed is:

1. A switching arrangement comprising a magnetic structure of remanently magnetizable material and defining a plurality of distinct and separately magnetizable sections, a plurality of magnetic reed switches coupled to said sections, each of said sections being coupled to adjacent switches, and means for simultaneously and individually determining the magnetizations of said sections, each of said switches being positioned so that the series magnetization of adjacent ones of said sections determines the operation of said switches and each one of said sections simultaneously affects the operation of more than one of said switches.

2. A switching arrangement in accordance with claim 1 wherein said magnetic structure comprises a closed loop and each of said sections is coupled to adjacent switches at the ends of said sections.

3. A switching arrangement in accordance with claim 1 wherein said magnetic structure comprises a plurality of crossed legs extending radially, and each of said legs is coupled at its outer end to adjacent switches.

4. A switching circuit comprising a remanent magnetic structure, a plurality of magnetically operable reed switches, said reed switches bridging portions of said structure, each of said bridged portions of said structure being capable of carrying a magnetic flux through adjacent ones of said bridging reed switches, and a plurality of exciting windings intimately coupled to respective ones of said portions, a first pair of said exciting windings being selectively energizable to carry a magnetic flux into and out of at least one of said bridging reed switches to operate said one switch and a second pair of said exciting windings being selectively energizable in cooperation with at least one winding of said first pair of said exciting windings to preclude the passage of flux through an adjacent one of said bridging reed switches.

5. A switching circuit comprising a toroidal core of remanent magnetic material, means for generating flux flow in particular directions in selected sections of said core, a plurality of reed switching means bridged diametrically across said core, said reed switching means being operative in response to predetermined combinations of said flux flow directions for diverting said flux flow from said sections through said switching means, and output detecting means in circuit with said reed switching means responsive to the operation of selected ones of said switching means in predetermined combinations.

6. A magnetic switching arrangement comprising a toroidal core of remanent material divided into a plurality of sections, winding means coupled to each of said sections for establishing flux flow in one of a plurality of directions in each of said sections, a plurality of magnetizable reed switches diametrically disposed across said core magnetically linking selected ones of said sections and operative to close in response to selected combinations of said directions of flux flow, and output means for detecting predetermined combinations of the closure states of said reed switches.

7. A magnetic switching arrangement comprising a washer-shaped remanently magnetic core having at least four sections, at least a pair of magnetizable switches arranged such that each switch is magnetically coupled to at least a pair of sections and such that each section is magnetically coupled to each switch, and first means for causing magnetic fluxes to flow selectively through said sections and selected switches thereby to cause selective operation of said selected switches.

8. The invention defined in claim 7 wherein said first means includes second means for setting the remanent states of said sections such that each section will control the magnetic flux flow through the two switches next adjacent that section.

9. The invention defined in claim 8 wherein said second means is a plurality of windings each inductively coupled to a respective section and wherein said first means further includes a plurality of sources of positive and negative polarity pulses, each connectable to a respective winding to enable said pulses to establish particular remanent states in each of said sections thereby to cause selective operations of said switches.

10. The invention defined in claim 9 wherein each switch diametrically bridges said core in a manner such that the next adjacent pair of switches will be coupled to sections which are themselves diametrically disposed with respect to each other.

11. A switching arrangement comprising a reentrant magnetic structure having at least four sections and being of remanently magnetic material, at least two magnetizable sealed reed switches disposed on said structure such that each switch is magnetically coupled to at least two pairs of adjacent sections, a plurality of windings, each wound in a particular manner about a respective section, a plurality of sources of negative and positive polarity pulses, and circuit means for interconnecting each of said sources to a respective winding whereby said sources of selected polarities will energize said windings to selectively set the remanent states of said sections and thereby cause magnetic flux to flow through selected switches to cause their closures.

12. A switching arrangement comprising a magnetic structure having legs radially emanating from a common junction, a magnetic reed switch extending between the outer ends of each adjacent pair of said legs, means for simultaneously and independently determining the magnetization of each of said legs, said means including an individual and distinct winding on each of said legs, and means connected to said switches for determining their logical state after the determination of the magnetizations of the individual radial legs.

13. A switching arrangement in accordance with claim 12 wherein said magnetic structure is of a remanently magnetic material.

14. A switching arrangement comprising an integral magnetic structure defining a plurality of distinct magnetizable sections, magnetic reed switches extending between pairs of said sections such that each section affects operation of a pair of switches and operation of each switch is determined by at least a pair of sections, means for simultaneously and independently determining the magnetizations of said sections to define series magnetic circuits including at least a pair of said sections and a switch, and circuit means connected to said switches for detecting their logical state on the determination of the magnetizations of said sections.

References Cited by the Examiner

UNITED STATES PATENTS

| | | | |
|---|---|---|---|
| 2,919,430 | 12/59 | Rajchman | 340—174 |
| 3,002,066 | 9/61 | Ketchledge et al. | 200—87 |
| 3,037,085 | 5/62 | Lowry | 179—27.54 |

FOREIGN PATENTS

| | | |
|---|---|---|
| 807,398 | 1/59 | Great Britain. |

SAMUEL BERNSTEIN, *Primary Examiner.*

ROBERT K. SCHAEFER, *Examiner.*